United States Patent
Shirataki et al.

(10) Patent No.: US 7,077,254 B2
(45) Date of Patent: Jul. 18, 2006

(54) OUTER RACE MEMBER FOR ROLLER TYPE ONE-WAY CLUTCH

(75) Inventors: Hirobumi Shirataki, Fukuroi (JP); Tomoharu Ando, Fukuroi (JP); Hideharu Oishi, Fukuroi (JP)

(73) Assignee: NKS-Warner K.K., Tokyo (JP)

( * ) Notice: Subject to any disclaimer, the term of this patent is extended or adjusted under 35 U.S.C. 154(b) by 0 days.

(21) Appl. No.: 10/838,187

(22) Filed: May 5, 2004

(65) Prior Publication Data

US 2005/0000773 A1    Jan. 6, 2005

(30) Foreign Application Priority Data

May 7, 2003 (JP) .............................. 2003-128524

(51) Int. Cl.
*F16D 41/066* (2006.01)
(52) U.S. Cl. ..................... 192/45; 192/110 B
(58) Field of Classification Search ..................... None
See application file for complete search history.

(56) References Cited

U.S. PATENT DOCUMENTS

| | | | | |
|---|---|---|---|---|
| 5,156,378 A | * | 10/1992 | Harken et al. | 384/454 |
| 6,044,945 A | * | 4/2000 | Muramatsu | 192/45 |
| 2004/0109626 A1 | * | 6/2004 | Trubnikov et al. | 384/559 |

FOREIGN PATENT DOCUMENTS

JP        11-51091        2/1999

* cited by examiner

*Primary Examiner*—Rodney H. Bonck
(74) *Attorney, Agent, or Firm*—Miles & Stockbridge PC

(57) ABSTRACT

An outer race member for a roller type one-way clutch includes a plurality of pawls provided along an outer periphery for engaging with an opposite member, a cam surface formed on an inner periphery, and grooves formed in the inner periphery for disposing block bearings. A radial width of a peripheral portion including the groove is formed larger than a radial width of another portion.

10 Claims, 4 Drawing Sheets

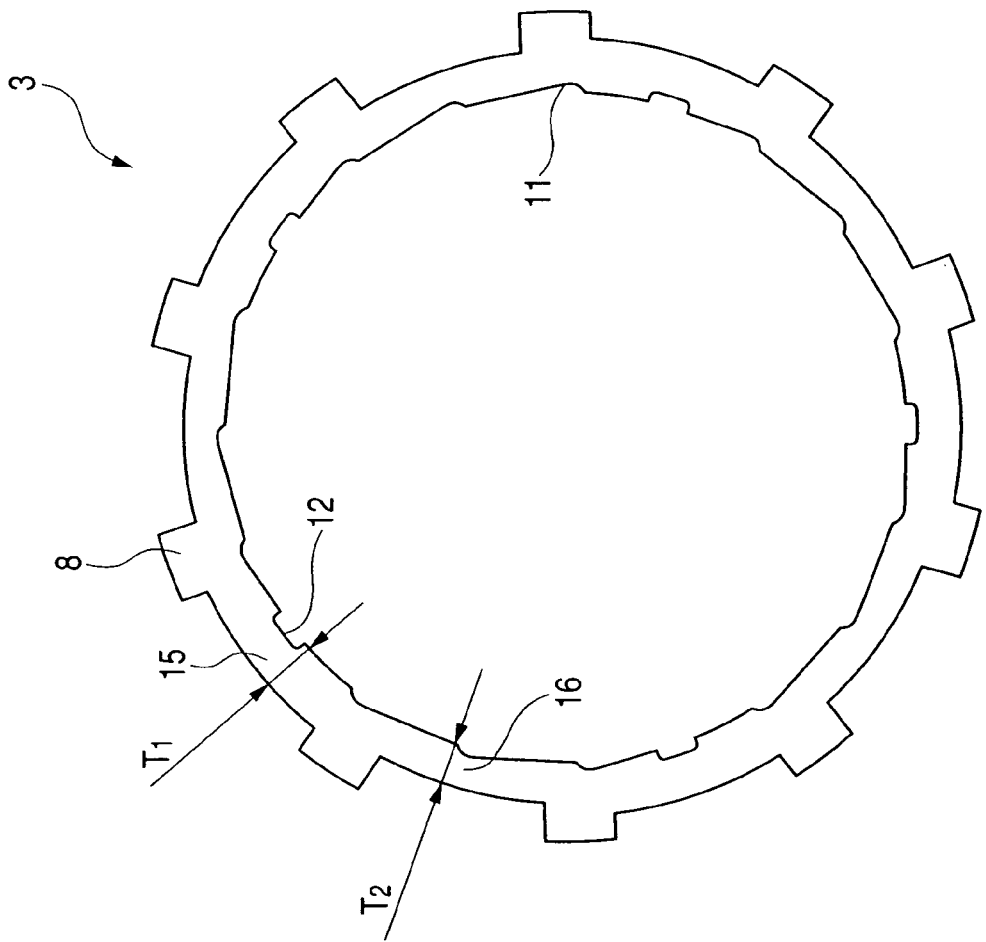
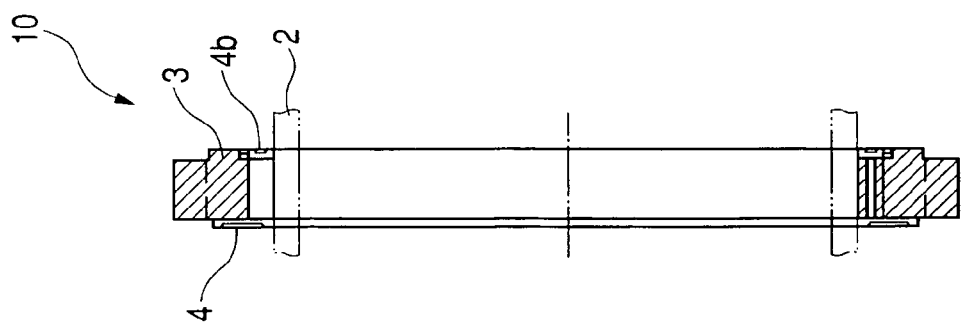

OUTER RACE MEMBER FOR ROLLER TYPE ONE-WAY CLUTCH

BACKGROUND OF THE INVENTION

1. Field of the Invention

The present invention relates to an outer race member of a roller type one-way clutch that is employed for an automatic transmission, etc., wherein engagement members are interposed between an inner race member and the outer race member.

2. Related Background Art

A roller type one-way clutch classified as one type of one-way clutch has a construction in which rollers defined as engagement members are pressed against and thus engaged with a cam surface formed on an inner peripheral surface of an outer race member or on an outer peripheral surface of an inner race member, thereby locking rotation in one direction.

FIG. 5 is a partially cut-away front view of this roller type one-way clutch in the prior art. A roller type one-way clutch 30 is constructed of an inner race 32 as a solid shaft member and an outer race 33 into which the inner race 32 is fitted. The outer race member, i.e., the outer race 33, is formed on its outer peripheral surface, with pawls 38 for engaging with an unillustrated opposite member.

Block bearings 37, rollers 36 and springs 35 for biasing the rollers 36 in an engaging direction, are disposed between the inner race 32 and the outer race 33. The outer race 33 has a cam surface on its inner peripheral surface, and the rollers 36 engage with this cam surface, thereby locking the rotation.

The springs 35 and the rollers 36 constitute a torque transmission mechanism, and the rollers 36 are held by a cage 34. The block bearings 37 effect positioning of the cage 34 with respect to the outer race 33.

The roller type one-way clutch is subject to potential fatigue failure originating from a groove for disposing the block bearing due to repetitive free/lock operations. Therefore, a thickness of the outer race in a radial direction becomes larger for ensuring a sufficient strength.

On the other hand, a decrease in weight is required of the roller type one-way clutch as a whole. It is therefore desired that the two requirements in terms of the strength and the decrease in weight be met simultaneously.

A roller type one-way clutch as described above is disclosed in Japanese Patent Application Laid-Open No. 11-051091. This document teaches that a weight of the whole one-way clutch is reduced by integrally forming the cage by use of plastic.

As disclosed in Japanese Patent Application Laid-Open No. 11-051091, if the cage is formed of plastic, this can reduce the weight. However, there still remains a problem in terms of the strength. Further, because the cage is not particularly heavy in the first place, the one-way-clutch is still heavy because of a heavy weight of the outer race member, etc.

SUMMARY OF THE INVENTION

Accordingly, it is an object of the present invention to provide an outer race member for a roller type one-way clutch that is capable of improving durability against repetitive free/lock operations while reducing a weight thereof.

To accomplish the above object, an outer race member for a roller type one-way clutch according to the present invention preferably includes a plurality of pawls provided along an outer periphery for engaging with an opposite member, a cam surface formed on an inner periphery, and grooves formed in the inner periphery for disposing block bearings, wherein a radial width of a peripheral portion of the groove is formed larger than a radial width of another portion.

The peripheral portion of the groove in which the block bearing is disposed, is formed thicker in wall than the other portion, thereby making it possible to attain an outer race member capable of obtaining a necessary strength and attaining a reduction in weight.

BRIEF DESCRIPTION OF THE DRAWINGS

FIG. 2 is a sectional view taken along the line 2—2 in an axial direction in FIG. 1;

FIG. 3 is a front view showing an outer race member in a first embodiment;

DESCRIPTION OF THE PREFERRED EMBODIMENTS

Embodiments of the present invention will hereinafter be described in detail with reference to the accompanying drawings. It should be noted that the same components are marked with the same numerals throughout the drawings.

Figure 1:
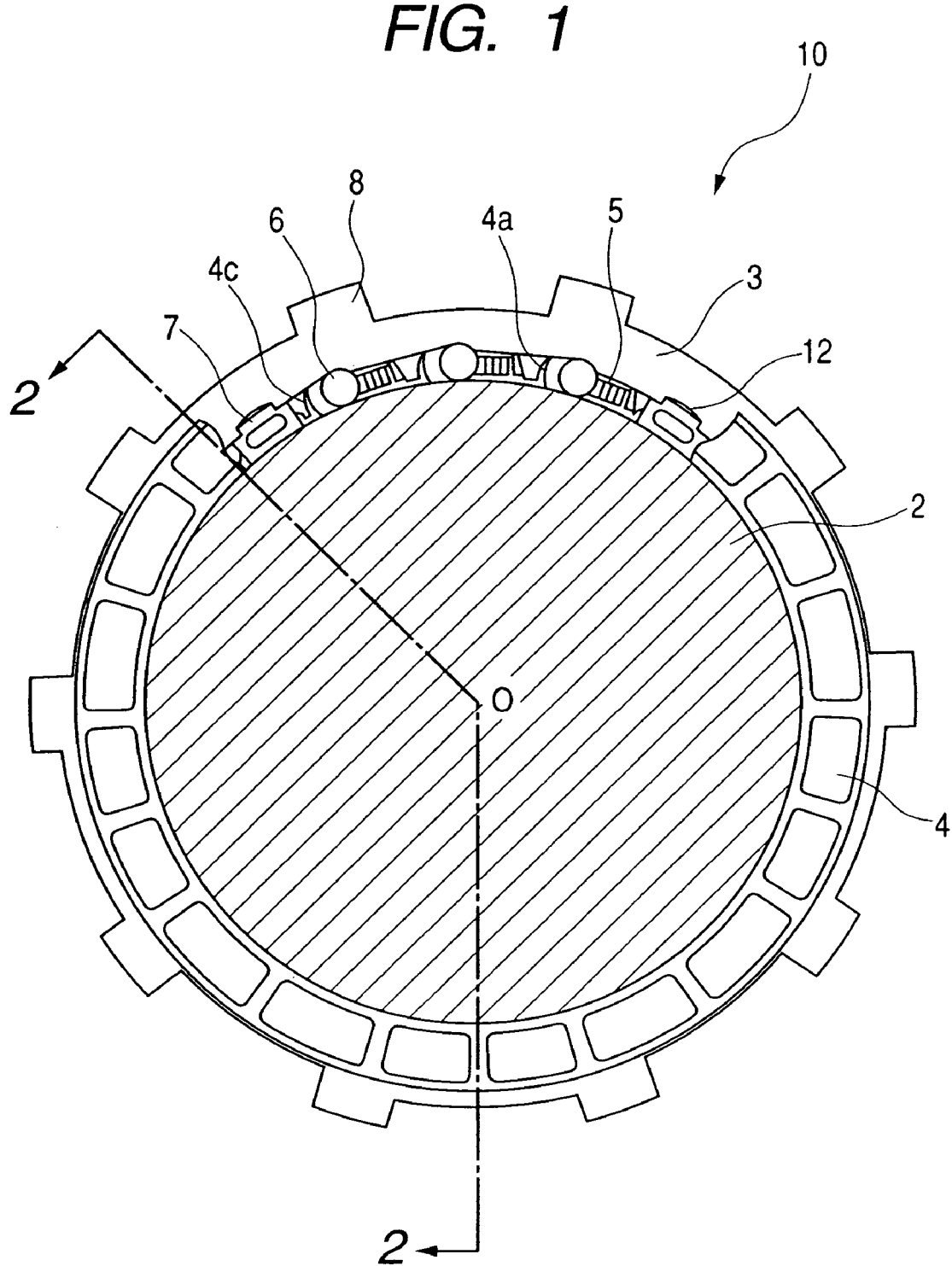
FIG. 1 is a partially cut-away front view of a one-way clutch including an outer race member of the present invention.

FIG. 1 is a partially cut-away front view of a one-way clutch including an outer race member according to the present invention. FIG. 2 is a sectional view taken along the line 2—2 in an axial direction in FIG. 1. A roller type one-way clutch 10 is constructed with an inner race member as a solid shaft member, i.e., an inner race 2, and of an outer race member, viz., an outer race 3, taking substantially an annular shape, into which the inner race 2 is fitted on its inner diametric side. The outer race 3 has a plurality of pawls 8 provided at equal intervals in a peripheral direction on an outer peripheral surface thereof, and engages through these pawls with an unillustrated opposite member.

Block bearings 7, rollers 6, and springs 5 for biasing the rollers 6 in an engaging direction are disposed between the inner race 2 and the outer race 3. The outer race 3 has a configuration, wherein a cam surface 11 (see FIG. 3) is provided on its inner peripheral surface, and the rollers 6 engage with this cam surface 11, thereby locking the rotation.

The rollers 6 and the springs 5 constitute a torque transmission mechanism, and a cage 4 is provided for holding the rollers 6. The block bearing 7 effects positioning of the cage 4 with respect to the outer race 3, and has a bearing function.

The rollers 6, the springs 5 and the block bearings 7 are, as shown in FIG. 1, arranged along the peripheral direction of the one-way clutch 10. Three rollers 6 and three springs 5 are provided between successive block bearings 7, which are disposed at equal intervals in the peripheral direction.

The block bearings 7 are assembled in from window portions (not shown) formed in cages 4, and upper (radially outer) portions of the bearings 7 are fitted in a plurality of disposition grooves 12 formed in an inner peripheral surface of the outer race 3, thus effecting positioning of the block bearings 7. Moreover, lower (radially inner) portions of the block bearings 7 are caught between protrusions 4c provided along peripheries of the window portions and protruding outwards in the radial direction, and are thus set in a fixed state, thereby positioning the block bearings 7 in the peripheral direction.

As shown in FIG. 2, the cage 4 includes a flange portion 4b on one side end surface in the axial direction, this flange portion 4b taking substantially an annular shape and extending outwards in the radial direction. The cage 4 is held by the outer race 3 through this flange portion 4b. The other side end of the cage 4 in the axial direction abuts on a side end surface of the outer race 3 in the axial direction.

FIRST EMBODIMENT

The outer race member in a first embodiment of the present invention will hereinafter be explained in detail. FIG. 3 is a front view showing the outer race member 3 in the first embodiment. A basic configuration of the outer race member 3 is as explained above. As can be understood from FIG. 3, a radial width (thickness) $T_1$ of a contiguous portion 15 of the disposition groove 12 in the peripheral direction in a section between the adjacent pawls 8, 8 at an outer diametric portion of the disposition groove 12 wherein the upper portion of the block bearing 7 is disposed, is formed larger than other portions.

On the other hand, a portion 16 having no disposition groove 12, provided with the cam surface 11 and contiguous to the cam surface 11, has a radial width T2 and is smallest in thickness throughout the outer race member 3. A strength is improved by increasing the wall thickness of the portion peripheral to the disposition groove 12 where the fatigue failure is easy to occur, while decreasing the wall thickness of a portion peripheral to the cam surface 11 of which the strength is not required so much, thereby enabling the weight of the outer race member 3 to be reduced.

Although a relationship such as $T_1 > T_2$ is established, the width $T_1$ may be the same as the radial width of the conventional outer race member, and a reduction in weight of the whole outer race member 3 can be attained by reducing the width $T_2$ relative to the width $T_1$.

SECOND EMBODIMENT

Figure 4:
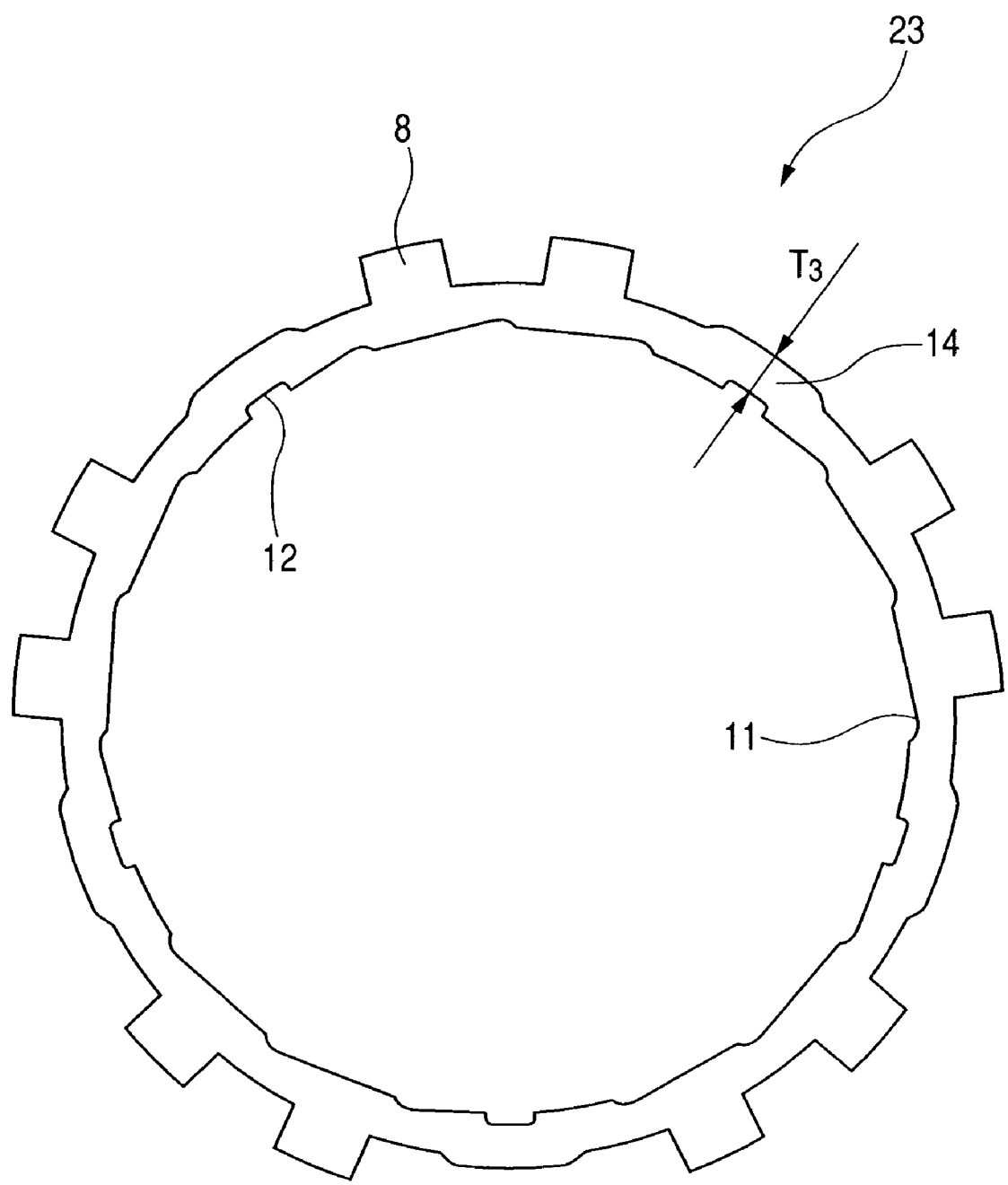
FIG. 4 is a front view showing an outer race member in a second embodiment.
Figure 5:
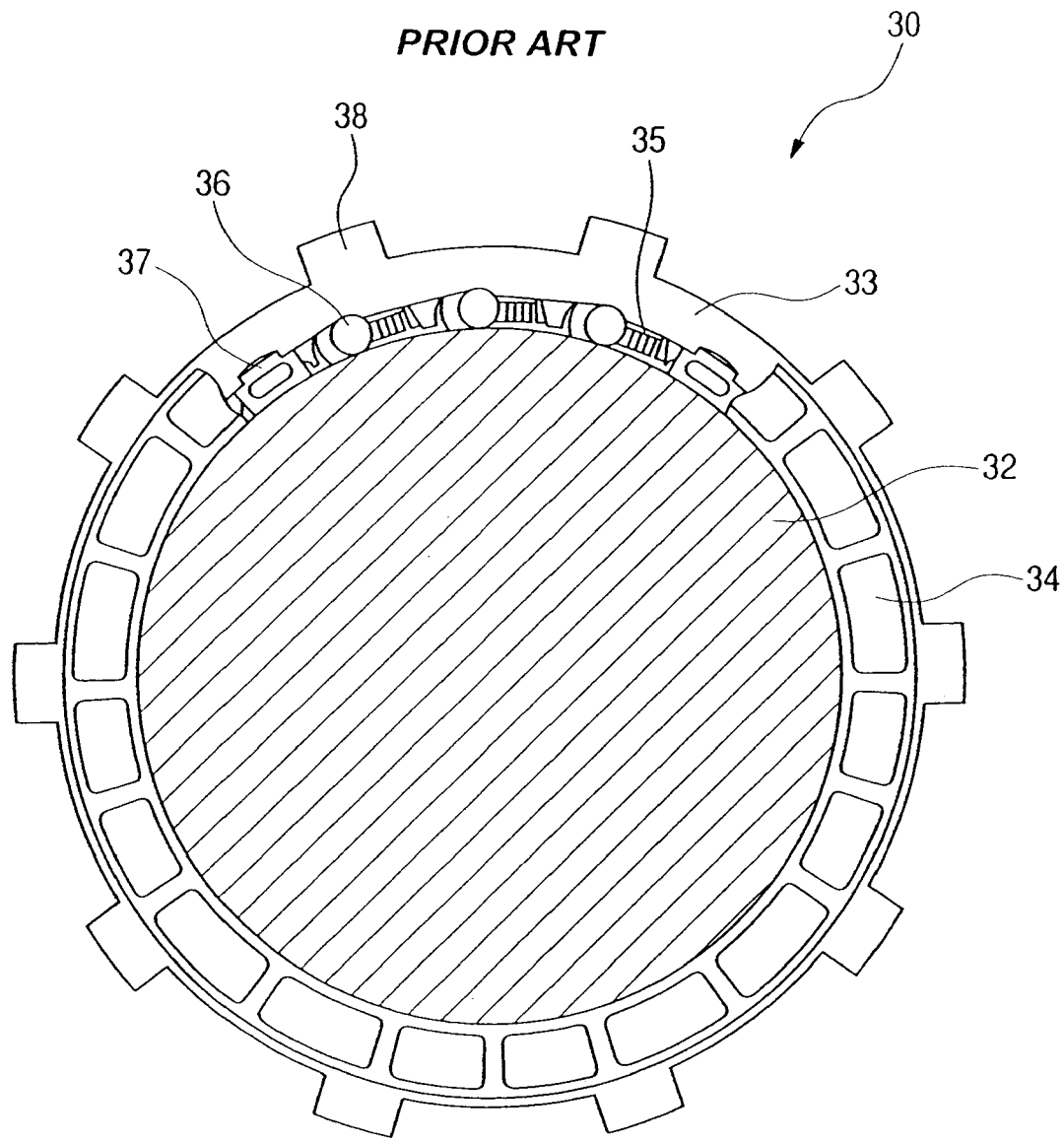
FIG. 5 is a partially cut-away front view of a roller type one-way clutch of the prior art.

Next, a second embodiment of the present invention will be explained. FIG. 4 is a front view showing an outer race member in the second embodiment. As shown in FIG. 4, according to the second embodiment, the pawls 8, 8 are disposed at unequal, i.e., narrow and wide, intervals. Then, the block bearing disposing portion 12 (groove portion) is formed on the inner diametric side in a wide section between the pawls 8, 8. Pitches of the wide section and of the narrow section are set respectively at 48° and 24° as central angles.

To enhance weight reduction, in the wide section between the pawls 8, 8, a wall thickness not of the entire section between the pawls 8, 8 but of a peripheral portion 14 is set large at the center of an outer diametric portion of the block bearing disposing portion 12.

The wall thickness, i.e., a radial width $T_3$ of the peripheral portion 14 is larger than a radial width of an area not provided with the block bearing disposing portion 12. A peripheral width of the peripheral portion 14 at the center of the block bearing disposing portion 12, is larger than a peripheral width of an adjacent portion of the block bearing disposing portion 12.

The peripheral portion 14 is provided to encompass the block bearing disposing portion 12 where the fatigue failure is easy to occur, thereby making it possible to ensure a strength of the block bearing disposing portion 12 especially requiring a sufficient strength.

Table 1 shows a result of a comparative test for mass and durability between the outer race member in the second embodiment of the present invention and the conventional outer race member. Note that a test condition is given as follows.

Test condition: Transmission torque 500N·m
Work specifications: Outer diameter; approximately φ 130 mm (pawl portion 142 mm)
  Inner diameter; approximately φ 118 mm
  Thickness; approximately 12 mm
  Rollers; 15 pieces
  Block bearings; 5 pieces
  Pawls; totally 10 portions (alternate wide-and-narrow pitches . . . wide pitch 48°, narrow pitch 24°)

TABLE 1

| | Mass of Outer Race | Durable Life-Time |
|---|---|---|
| Embodiment | 340 g | About 1000000 Cycles |
| Comparative Example | 359 g | About 1000000 Cycles |

As apparent from Table 1, according to the second embodiment of the present invention, the mass is decreased by 19 g, thus attaining the reduction in weight. Nevertheless, the same durability is achieved.

The present invention, which has been discussed so far, can be changed in a variety of forms. For example, the rollers and the springs are disposed by threes between the block bearings 7 in FIG. 1, but can be also, as a matter of course, provided by a number of pieces other than threes. Namely, each of the numbers of the rollers and the springs can be set smaller or larger than three.

Moreover, according to the second embodiment, the pitches of the wide section and of the narrow section between the pawls 8, 8 are set respectively at 48° and 24° as the central angles. However, other sizes (central angles) can be, as a matter of course, set.

According to the present invention, it is feasible to provide an outer race member of the roller type one-way clutch that is capable of improving the durability against the repetitive free/lock operations while reducing the weight.

What is claimed is:

1. An outer race member for a roller type one-way clutch, comprising:
    a plurality of pawls provided at predetermined intervals along an outer periphery for engaging with an opposite member;
    a cam surface formed on an inner periphery; and
    grooves for disposing block bearings and which are formed in the inner periphery in circumferential portions between pairs of adjacent pawls,
    wherein parts of the circumferential portions adjacent to the grooves have greater radial width than circumferential portions which are disposed between other pairs of adjacent pawls and in which grooves for disposing block bearings are not formed.

2. An outer race member for a roller type one-way clutch according to claim 1, wherein the parts of greater radial width extend from the grooves to the corresponding adjacent pawls.

3. An outer race member for a roller type one-way clutch according to claim 1, wherein circumferential portions of reduced radial width are disposed between the parts of greater radial width and the corresponding adjacent pawls.

4. An outer race member for a roller type one-way clutch according to claim 1, wherein the plurality of pawls are disposed at equal circumferential intervals.

5. An outer race member for a roller type one-way clutch according to claim 1, wherein an interval between pawls adjacent to a circumferential portion in which a groove for disposing a block bearing is formed is greater than an interval between pawls adjacent to a circumferential portion in which a groove for disposing a block bearing is not formed.

6. An outer race member for a roller type one-way clutch, comprising:
 a plurality of pawls provided at predetermined intervals along an outer periphery for engaging with an opposite member;
 a cam surface formed on an inner periphery; and
 grooves for disposing block bearings and which are formed in the inner periphery in circumferential portions between pairs of adjacent pawls,
 wherein the circumferential portions in which the grooves are formed are of greater outer radial dimension than circumferential portions between other pairs of adjacent pawls and in which grooves for disposing block bearings are not formed.

7. An outer race member for a roller type one-way clutch according to claim 6, wherein the circumferential portions of greater outer radial dimension constitute entire sections between the corresponding adjacent pawls.

8. An outer race member for a roller type one-way clutch according to claim 6, wherein circumferential portions of reduced outer radial dimension are disposed between each said circumferential portion of greater outer radial dimension and the corresponding adjacent pawls.

9. An outer race member for a roller type one-way clutch according to claim 6, wherein the plurality of pawls are disposed at equal circumferential intervals.

10. An outer race member for a roller type one-way clutch according to claim 6, wherein an interval between pawls adjacent to a circumferential portion in which a groove for disposing a block bearing is formed is greater than an interval between pawls adjacent to a circumferential portion in which a groove for disposing a block bearing is not formed.

* * * * *

UNITED STATES PATENT AND TRADEMARK OFFICE
CERTIFICATE OF CORRECTION

PATENT NO. : 7,077,254 B2  Page 1 of 1
APPLICATION NO. : 10/838187
DATED : July 18, 2006
INVENTOR(S) : Hirobumi Shirataki, Tomoharu Ando and Hideharu Oishi It is certified that error appears in the above-identified patent and that said Letters Patent is hereby corrected as shown below:

On the Title Page:

Item (73) should read as follows:

(73) Assignee: NSK-Warner K.K., Tokyo (JP)

Signed and Sealed this

Third Day of July, 2007

JON W. DUDAS
*Director of the United States Patent and Trademark Office*